United States Patent [19]
Beardsley et al.

[11] Patent Number: 5,313,640
[45] Date of Patent: May 17, 1994

[54] METHOD AND SYSTEM FOR THE EFFICIENT RESPONSE TO MULTIPLE DIFFERENT TYPES OF INTERRUPTS

[75] Inventors: Brent C. Beardsley; David L. Leigh; Cortland D. Starrett; John R. Wolfe, all of Tucson, Ariz.

[73] Assignee: International Business Machines Corporation, Armonk, N.Y.

[21] Appl. No.: 949,674

[22] Filed: Sep. 23, 1992

[51] Int. Cl.$^5$ .............................. G06F 13/24
[52] U.S. Cl. .................. 395/725; 364/230.2; 364/241.2; 364/238.3; 364/DIG. 1
[58] Field of Search ............... 395/725, 325, 275, 775, 395/200; 340/825.51

[56] References Cited

U.S. PATENT DOCUMENTS

| | | | |
|---|---|---|---|
| 4,107,785 | 8/1978 | Seipp ................................ | 395/775 |
| 4,200,912 | 4/1980 | Harrington et al. ................ | 395/725 |
| 4,616,314 | 10/1986 | Wilson et al. ...................... | 364/200 |
| 4,644,462 | 2/1987 | Matsubara et al. ................ | 395/275 |
| 5,072,363 | 12/1991 | Gallagher .......................... | 395/725 |
| 5,115,506 | 5/1992 | Cohen et al. ...................... | 395/725 |
| 5,125,093 | 6/1992 | McFarland ........................ | 395/725 |
| 5,129,063 | 7/1992 | Sainola et al. .................... | 395/275 |
| 5,202,964 | 4/1993 | Crouch .............................. | 395/275 |

Primary Examiner—Gopal C. Ray
Attorney, Agent, or Firm—Lisa L. B. Yociss; Dillon, Andrew J.; H. St. Julian

[57] ABSTRACT

A method and system in a data processing system for the efficient response to multiple different types of interrupts. The data processing system includes at least one host and a storage subsystem having storage subsystem devices and at least one storage subsystem controller. The storage subsystem controller operates in multiple different states. Interrupts of multiple different types are generated by sources of real time events and are received by the storage subsystem controller. A selected type of interrupt as a preferred next interrupt to be received by the storage subsystem controller is then determined in response to the determination of the current state of the storage subsystem controller. A particular state associated with the occurrence of the selected type of interrupt is then determined. Reversible processing associated with the particular state is initiated prior to receipt of a next interrupt wherein the selected type of interrupt is efficiently enhanced in priority in response to the current state of the storage subsystem controller.

12 Claims, 5 Drawing Sheets

| INTERRUPT STATE | Interrupt A | Interrupt B | Interrupt C | Interrupt D |
|---|---|---|---|---|
| State 1 | | | | |
| State 2 | State* 2 | State 3 | | |
| State 3 | | State* 4 | | State 7 |
| State 4 | State* 5 | | State* 1 | State 6 |
| State 5 | | | | State 7 |
| State 6 | | | | |
| State 7 | | State* 1 | | |

Fig. 5

METHOD AND SYSTEM FOR THE EFFICIENT RESPONSE TO MULTIPLE DIFFERENT TYPES OF INTERRUPTS

BACKGROUND OF THE INVENTION

1. Technical Field

The present invention relates in general to a method and system for the efficient response to multiple different types of interrupts in a data processing system and in particular to a method and system for the initiation of reversible processing associated with a particular state of a storage subsystem controller in a data processing system prior to receipt of a next interrupt. Still more particularly, the present invention relates to a method and system for the determination of a particular state of a storage subsystem controller associated with an occurrence of a selected type of interrupt.

2. Description of the Related Art

Main frame computer systems generally use auxiliary storage subsystem devices for mass storage of data. In auxiliary storage subsystem devices data is recorded by making a physical change to a medium. Examples of physical storage of data on media are: pitting of aluminum by lasers; grooving of a plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system or compact disk player, the electrical signal is decoded to reproduce binary data.

Direct Access Storage Devices (DASD, pronounced "dasdee") are one type of auxiliary storage subsystem device. In a direct access storage device access time to data is independent of the location of the data in the storage device. Presently, disk drive units are the most common type of DASD. A disk drive unit records data on rotatable disks. The write and read transducers are moved radially inward and outward relative to the disk and the disk is rotated to bring any location of the disk and the appropriate transducer into proximity with one another. A DASD may be contrasted to an indirect access storage device, such as tape drives, where accessibility of data is location dependent.

The fact that access time to a location on a disk is more or less random does not mean that it is instantaneous. During a period when a DASD waits for a spinning disk to move to the correct position for a transducer to access a location, a storage subsystem controller for the DASD can perform other functions. An example of a function performed during a waiting period is the downloading of data from a buffer memory to a channel to a host computer. In large, multiple computer data processing systems, such as those serving airline reservation systems, a large number of direct access storage devices serve several computers. The storage subsystem controller is logically positioned between the DASDs and the host computers. The storage subsystem controller handles connection and disconnection between a particular computer and magnetic disk unit for transfer of data.

The IBM 3990 storage controller is an example of a storage subsystem controller used to control connections between magnetic disk units and host computers. The IBM 3990 Model 3 type controller, which is available from IBM Corporation, can handle up to sixteen channels from host computers and up to sixty-four magnetic storage units. Within the storage subsystem controller are two multipath storage directors and four storage paths, two of which are associated with each multipath storage director. Each multipath storage director may be connected to up to eight incoming channels from host computers, for a total of sixteen channels for the storage controller as a whole. Each multipath storage director is connected to two storage paths, thus functioning as an $8 \times 2$ switch.

Channels are physical links between the storage subsystem controller and the host computers. Usually, a host computer has two or four channels, half being physically connected to the one multipath storage director and the other half being connected to the other multipath storage director. Each storage path is connected to all of the available magnetic disk units. Upon indication that a disk is ready, the controller can secure any one of a plurality of the channels and storage paths back to a host to establish a data path. It is a feature of the IBM 3990 storage controller that an input/output transaction between a host computer and a magnetic disk unit may be broken into two separate connections, which may be handled along distinct channels and storage paths. A request need not be responded to over the same channel on which it was received. This feature increases throughput through the storage subsystem controller, because during the disconnect period the storage subsystem controller handles other tasks, such as a connection for another computer with another DASD.

In known data processing systems, storage subsystem controllers are required to respond to interrupts generated by multiple sources of real time events such as hosts or DASD'S. A host may request a data path to a DASD in order to store or retrieve data. The storage subsystem controller must perform processing in response to an interrupt generated by the host's request.

Multiple hosts and DASD's may interrupt the storage subsystem controller and request processing at the same time. In this case, the storage subsystem controller must prioritize the interrupts in some way in order to respond to them. Some systems which receive very few different types of interrupts may programmatically test each interrupt received to determine the type. Once the type is determined, a transition occurs to the state associated with the received interrupt.

Other systems utilize a more formal state machine implementation. A central interrupt handler may be utilized to receive all types of interrupts and dispatch the appropriate processing. In these systems, the central interrupt handler converts a received type of interrupt into an index into a state transition table. Based on the type of interrupt received and the current state of the system, the next state is determined utilizing the state transition table. The system then changes to the determined state and processes the received interrupt. Control is then passed back to the central interrupt handler to receive the next interrupt.

It should therefore be apparent that a need exists for a method and system for the initiation of reversible processing by changing the state of a storage subsystem controller to a state associated with a selected interrupt prior to receipt of a next interrupt.

SUMMARY OF THE INVENTION

It is therefore one object of the present invention to provide an improved method and system for the efficient response to multiple different types of interrupts in a data processing system.

It is another object of the present invention to provide an improved method and system for the initiation of reversible processing associated with a particular state of a storage subsystem controller prior to receipt of a next interrupt within a data processing system.

It is yet another object of the present invention to provide an improved method and system for the determination of a particular state of a storage subsystem controller associated with an occurrence of a selected type of interrupt in a data processing system.

The foregoing objects are achieved as is now described. A method and system in a data processing system are disclosed for the efficient response to multiple different types of interrupts. The data processing system includes at least one host and a storage subsystem having storage subsystem devices and at least one storage subsystem controller. The storage subsystem controller operates in multiple different states. Interrupts of multiple different types are generated by sources of real time events and are received by the storage subsystem controller. A selected type of interrupt for a next interrupt to be received by the storage subsystem controller is determined in response to the determination of the current state of the storage subsystem controller. A particular state associated with the occurrence of the selected type of interrupt is then determined. Reversible processing associated with the particular state is initiated prior to receipt of a next interrupt.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
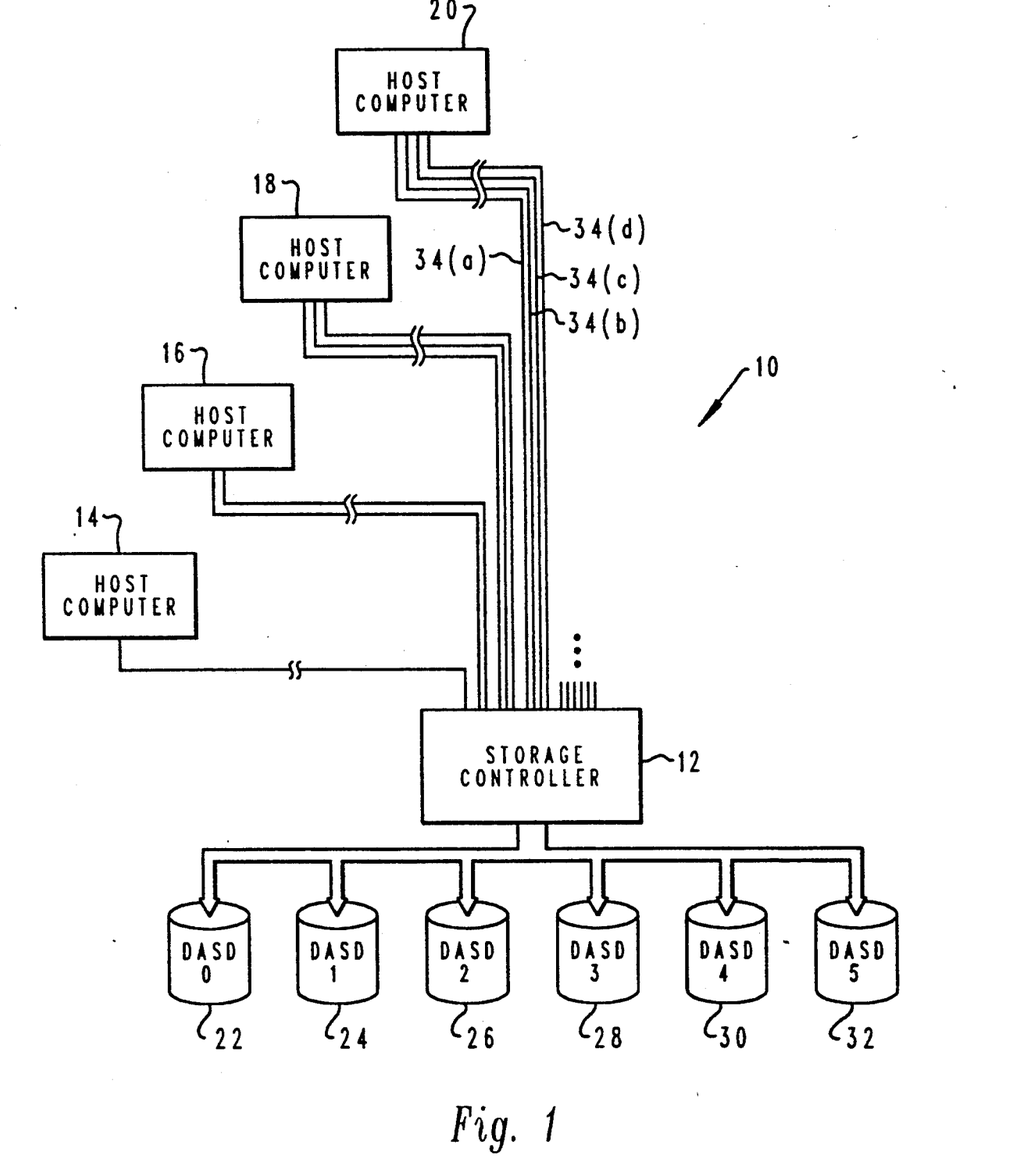
FIG. 1 depicts a block diagram of a data processing system which may be utilized to implement the method and system of the present invention.

With reference now to the figures and in particular with reference to FIG. 1, there is depicted a high level block diagram of a data processing system 10. Data processing system 10 includes a storage subsystem controller 12, a plurality of host computers 14, 16, 18 and 20 and a plurality of storage subsystem devices 22–32. Storage subsystem devices 22–32 are generally magnetic storage units, such as disk drives. Storage subsystem devices 22–32 are also connected to storage subsystem controller 12 for selective connection for communication with host computers. Storage subsystem controller 12 is preferably an IBM 3990 Model 3 type controller, which is available from IBM Corporation. Host computers 14–20 are typically main frame systems such as the IBM 3090, the ES9000 Model computer, or comparable systems. Host computers 14–20 are connected to storage subsystem controller 12 with at least one and up to four channels. For example, host computer 20 is connected to storage subsystem controller 12 by channels 34(a), 34(b), 34(c) and 34(d). The channels come in two types, parallel data channels and serial data channels. Certain optical serial channels are used for data transmission up to 15 kilometers. Parallel channels utilize electrical signals and are generally not used at distances of greater than about 125 meters.

Figure 2:
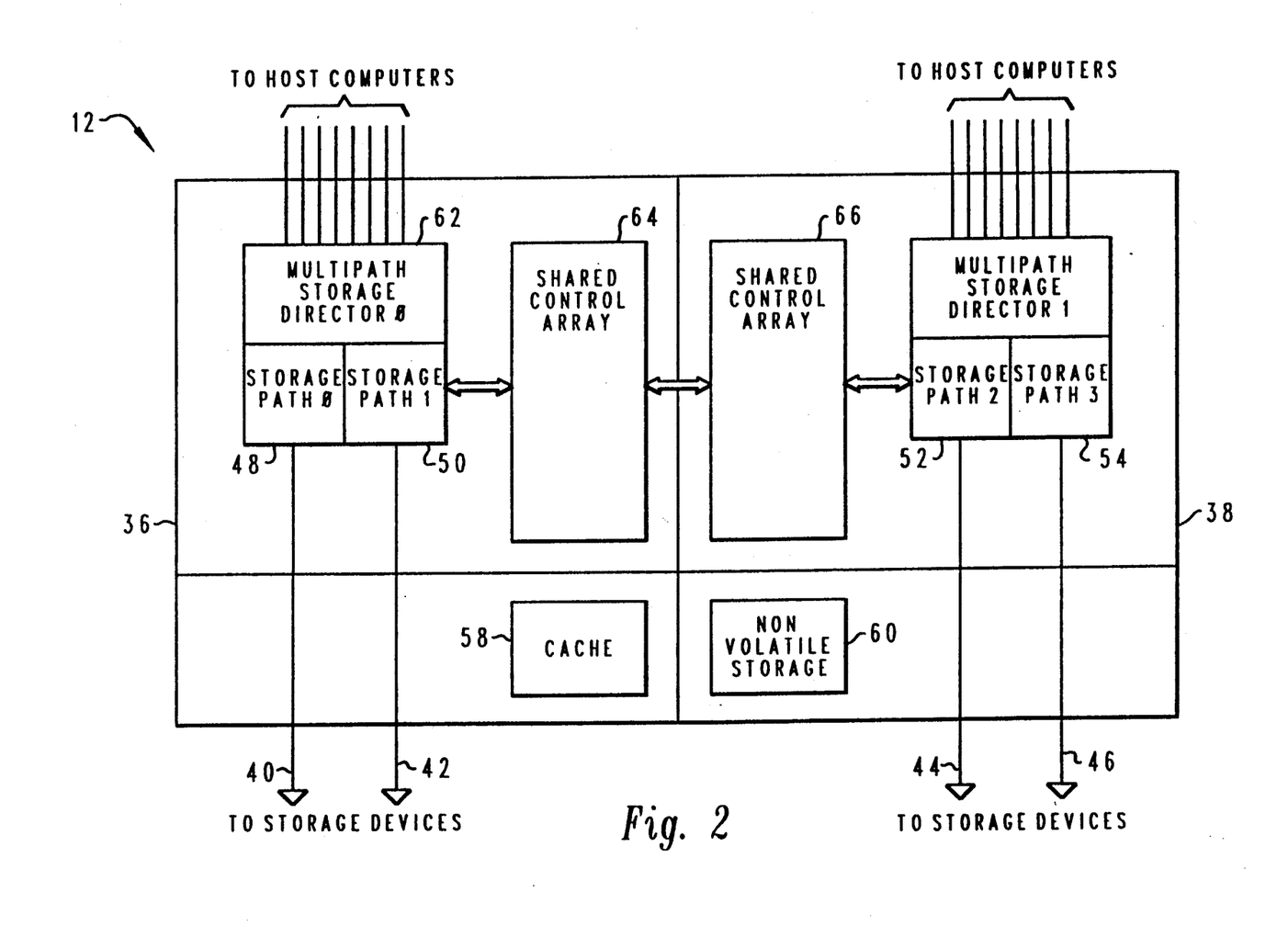
FIG. 2 illustrates a block diagram of a storage subsystem controller from the data processing system of FIG. 1.

FIG. 2 depicts storage subsystem controller 12 in greater detail. Storage subsystem controller 12 has two storage clusters 36 and 38, each of which provides for selective connection between a host computer and a storage subsystem device. Although four host computer systems and six storage subsystem devices are depicted in FIG. 1, storage subsystem controller 12 can handle additional channels and storage subsystem devices.

Data from a given host computer system may be stored to any Of the storage subsystem devices. Data may also be recovered from any of the storage subsystem devices for a given host computer. Where a host computer is connected by at least two channels, one each is connected to storage clusters 36 and 38. Similarly, where four channels are provided, two are connected to storage cluster 36 and two to storage cluster 38. Storage subsystem controller 12 may receive a request from a host computer over a channel, and respond to the request over any one of the channels connected to the same host computer. The channels associated with one host computer are known as a path group. Storage subsystem controller 12 has knowledge of the path groups, having received it from each host computer.

Storage subsystem controller 12 has four paths 40, 42, 44 and 46 to the storage subsystem devices. Each data path 40–46 is associated with one of storage path processors 48–54, respectively. Each data path goes to all of the storage subsystem devices. Only one data path has access to a storage subsystem device at a time however. Because storage subsystem controller 12 attempts to synchronize disconnects and reconnects between storage subsystem devices and host computers based upon rotational position of a disk in the storage subsystem device, storage subsystem controller 12 may be seen to operate, in essence, as a data transfer traffic manager. An objective of the traffic management scheme is to respond to requests received over the channels to the host computers as quickly as possible. One way to meet this objective is to keep the storage path processors occupied with data moving between host computers and storage subsystem devices.

Figure 3:
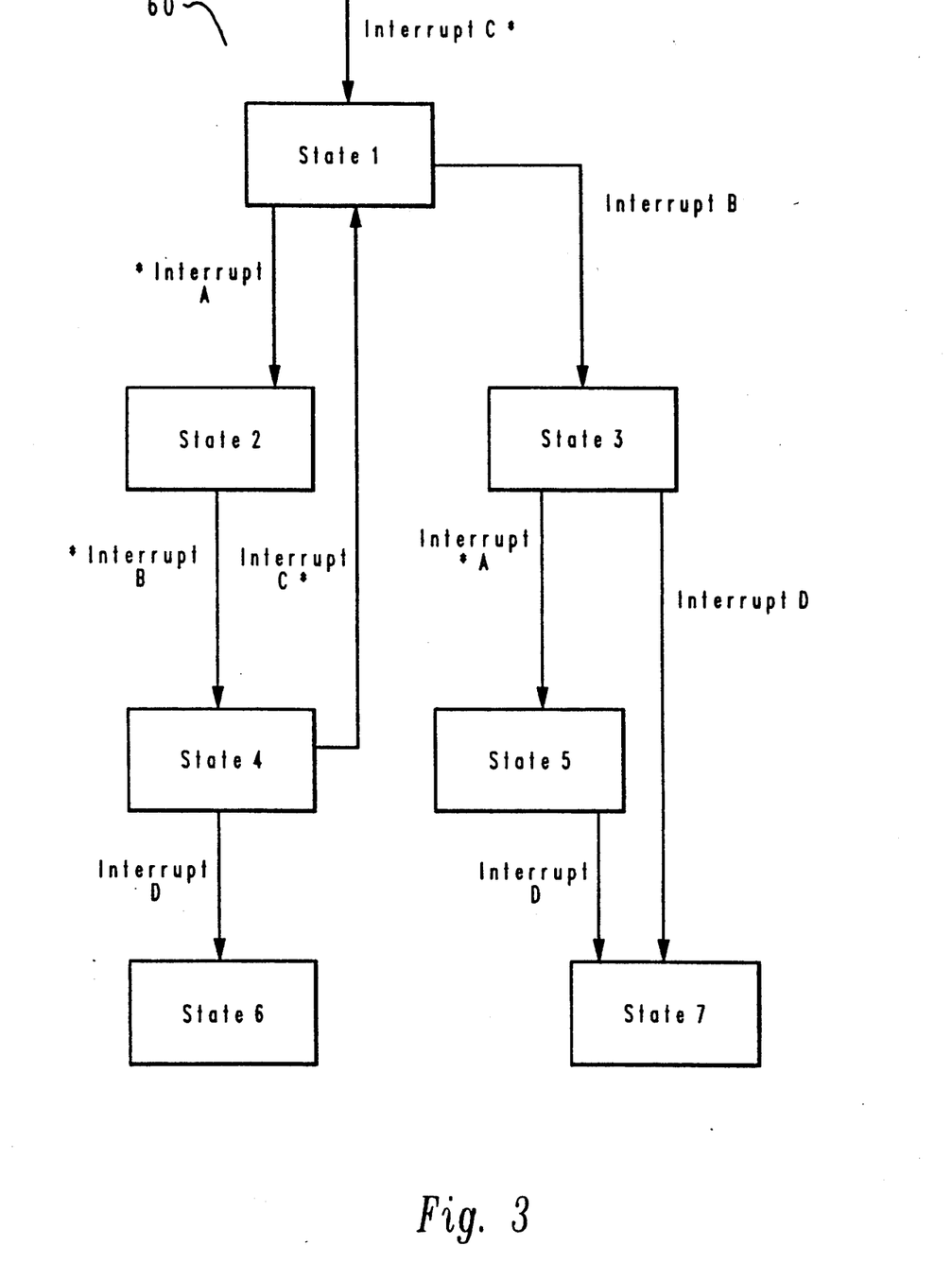
FIG. 3 depicts a state machine in a storage subsystem controller in accordance with the present invention.

With reference now to FIG. 3, there is depicted a state machine 60 in a storage controller subsystem 12 in accordance with the present invention. State machine 60 includes seven different states; states one through seven, and receives four different types of interrupts; interrupt A, interrupt B, interrupt C, and interrupt D. As illustrated, while in state one, an interrupt A or an interrupt B may be received. If an interrupt A is received, state machine 60 changes state from state one to state two. If an interrupt B is received, state machine 60 changes state from state one to state three. Interrupt A has been selected as illustrated by the asterisk. After a determination that the current state of state machine 60 is state one, interrupt A is determined to be the selected interrupt. State two is associated with interrupt A when the current state of state machine 60 is state one. Therefore, prior to receipt of an interrupt, state machine 60 will change state from state one to state two. After an interrupt is received, if it is not the selected interrupt, interrupt A, state machine 60 will need to transition back from state two to state one in order to process the received interrupt. However, if the received interrupt is the selected interrupt, overhead processing such as changing the state of state machine 60 has already been initiated.

While in state two, only one type of interrupt, interrupt B, may be received. Interrupt B is the selected interrupt. Receipt of interrupt B while in state two causes state machine 60 to change to state four. Therefore, since interrupt B is the selected interrupt, the state change from state two to state four will occur before an interrupt is received.

As is illustrated, while in state three, receipt of an interrupt A will cause a transition from state three to state five. Receipt of an interrupt D while in state five will cause state machine 60 to change from state five to state seven. Referring again to state three, receipt of an interrupt D will cause a transition from state three to state seven. Since interrupt A is the selected interrupt while in state 3, state machine 60 will transition to state five prior to receipt of an interrupt. If the next interrupt to be received is the selected interrupt, interrupt A, the state transition has already occurred. If however the next interrupt is interrupt D, state machine 60 will change state back from state five to state three, and then change state from state three to the state associated with interrupt D, state seven.

Referring back to state four, receipt of an interrupt C will cause a transition back to state one. Receipt of an interrupt D while in state four will cause a transition from state four to state six. Since interrupt C is the selected interrupt, state machine 60 will change state from state four to state one prior to receipt of an interrupt.

It is necessary to determine the current state of state machine 60 in order to determine the effect of a receipt of a type of interrupt. As depicted, receipt of an interrupt B while in state one caused a transition to state three, while receipt of an interrupt B while in state two caused a transition to state four.

Figure 4:
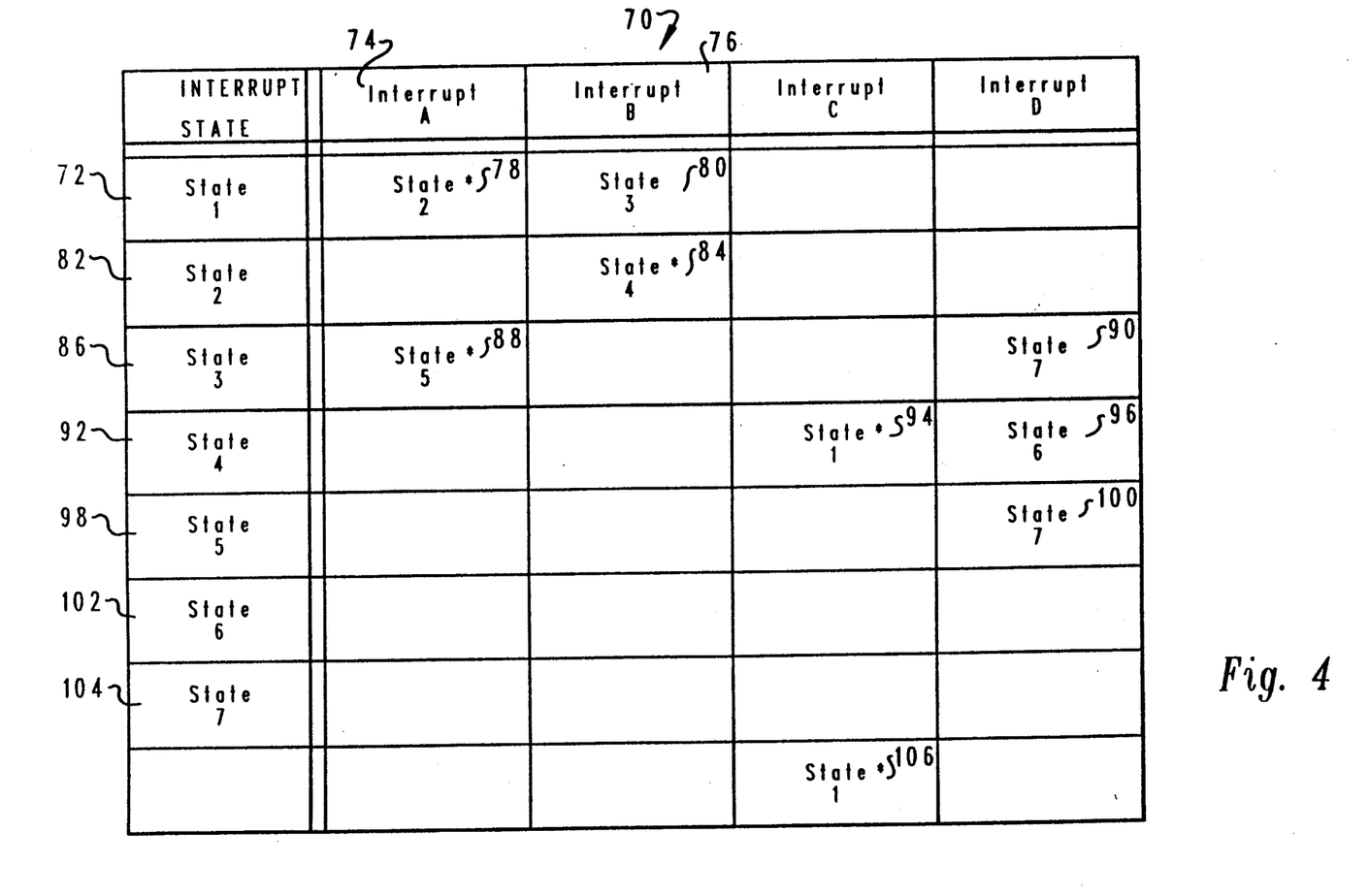
FIG. 4 depicts a state table of FIG. 3 in accordance with the present invention.

With reference now to FIG. 4, there is depicted a state table 70 of state machine 60. State table 70 illustrates the state changes described above. While in state one, an interrupt A and an interrupt B may be received. Block 78 illustrates that if while in state one an interrupt A is received, state two is the next state. Block 80 depicts that if while in state one an interrupt B is received, state three is the next state. Interrupt A has been selected as a high priority interrupt as depicted by the asterisk in block 78. The selection of an interrupt as a high priority interrupt may be based on any criteria such as frequency of occurrence, or importance of the interrupt to operation even if it infrequently occurs.

In anticipation of a selected interrupt A, state machine 60 may change state from state one to state two prior to receipt of a next interrupt. If the next interrupt is the selected interrupt, the state machine has already made the state transition enabling processing to be more efficient since overhead associated with the state transition has already occurred. In some cases, some processing associated with the type of interrupt such as application processing may also occur prior to actual receipt of a next interrupt. If, however, the next interrupt is not the selected interrupt, the state machine will need to change state back from state two to state one. The state machine will then need to change state from state one to the state associated with the received interrupt.

Priorities are associated with the different sources of real time events. These priorities can be configured dynamically. Different configurations provide a mechanism to determine the order of service when multiple different types of real time events are received simultaneously. This invention provides for the dynamic configuration of interrupt priorities of sources of real time events as function of the state of the system. This configuring of priorities provides streamlining for a single selected type of next interrupt.

If state machine 60 is in state two when an interrupt B is received, block 84 illustrates that state four is the next state. Block 84 depicts that interrupt B is the selected interrupt. Since interrupt B is the selected interrupt, the state machine will transition from state two to state four prior to receipt of a next interrupt.

An interrupt A received while in state three will cause the state machine to transition to state five as depicted by block 88. Block 88 also depicts interrupt A as the selected interrupt, thus causing a state change from state three to state five prior to receipt of a next interrupt. Block 90 illustrates that an interrupt D received while in state three will cause a transition to state seven.

Next, block 94 depicts that an interrupt C received while in state four will cause a transition to state one and an interrupt D received will cause a transition as depicted by block 96 to state six. Block 94 depicts interrupt C as the selected interrupt. If while in state five an interrupt D is received, block 100 illustrates a state change to state seven. Block 106 depicts an interrupt C causing a transition from a previous state to state one.

Figure 5:
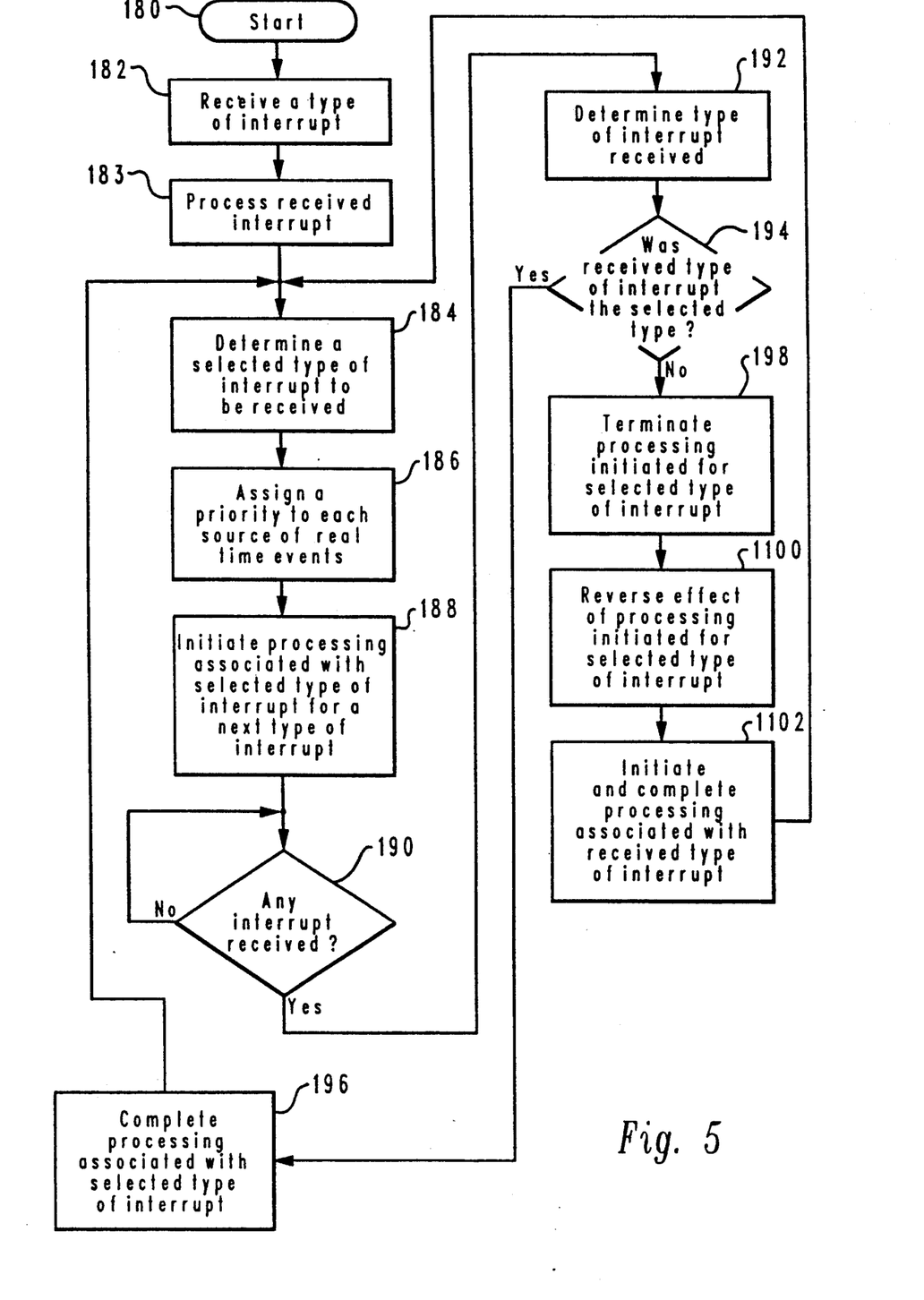
FIG. 5 illustrates a high level flow chart depicting receiving and responding to interrupts in accordance with the present invention.

Referring to FIG. 5, there is depicted a high level flow chart depicting receiving and responding to interrupts in accordance with the present invention. The process begins as illustrated at block 180 and thereafter passes to block 182 which depicts the receipt of a type of interrupt. Thereafter the process passes to block 183 which illustrates the processing of the received interrupt. The process next passes to block 184 which illustrates the determination of a selected type of interrupt for a next interrupt to be received. The determination is made based on the current state of the data processing system previously received depicted by block 182. The process then passes to block 186 which illustrates the assignment of a priority to each source of real time interrupts.

Next, the process passes to block 188 which depicts the initiation of processing for the selected type of interrupt for a next interrupt to be received. Block 190 illustrates a determination of whether or not any interrupt has been received. If a determination is made that an interrupt has not been received, the process passes back to block 190. Referring again to block 190, if a determination is made that an interrupt has been received, the process passes to block 192.

Block 192, thereafter, depicts a determination of a type of interrupt received. The process then passes to block 194 which illustrates a determination of whether or not the type of interrupt received was the selected type of interrupt for a next interrupt to be received. If a determination is made that the type of interrupt received was the selected type of interrupt to be received for a next interrupt, the process passes to block 196 which illustrates the completion of processing associated the selected type of interrupt to be received. The process again passes to block 184.

Referring again to block 194, if a determination is made that the type of interrupt received was not the selected type of interrupt to be received for a next interrupt, the process passes to block 198 which depicts the termination of processing initiated for the selected type of interrupt for a next interrupt to be received. Thereafter, the process passes to block 1100 which illustrates the reversal of the effects of the processing initiated for the selected type of interrupt. The process then passes to block 1102 which depicts the initiation and completion of processing associated with the type of interrupt received. The process then passes back to block 184.

While the invention has been particularly shown and described with reference to a preferred embodiment, it will be understood by those skilled in the art that various changes in form and detail may be made therein without departing from the spirit and scope of the invention.

We claim:

1. A method in a data processing system having at least one host and a storage subsystem including a plurality of storage subsystem devices and at least one storage subsystem controller for efficiently responding to interrupts of multiple different types received by said storage subsystem controller, said interrupts generated by a plurality of sources of real time events, said storage subsystem controller operating in one of a plurality of different states, said method comprising within said processing system the steps of:

determining a current state of said storage subsystem controller;

determining a selected type of interrupt as a preferred next interrupt to be received by said storage subsystem controller in response to said determination of said current state;

determining a particular state of said storage subsystem controller associated with said occurrence of said selected type of interrupt; and initiating reversible processing associated with said particular state prior to receipt of a next interrupt wherein said selected type of interrupt is efficiently enhanced in priority in response to said current state of said storage subsystem controller.

2. The method in a data processing system having at least one host and a storage subsystem including a plurality of storage subsystem devices and at least one storage subsystem controller for efficiently responding to interrupts of multiple different types received by said storage subsystem controller according to claim 1 further comprising the steps of:

terminating said initiated reversible processing if said next interrupt is not said selected type of interrupt;

reversing the effect of said initiated reversible processing; and performing processing associated with said next interrupt.

3. The method in a data processing system having at least one host and a storage subsystem including a plurality of storage subsystem devices and at least one storage subsystem controller for efficiently responding to interrupts of multiple different types received by said storage subsystem controller according to claim 1 wherein said reversible processing includes overhead processing.

4. The method in a data processing system having at least one host and a storage subsystem including a plurality of storage subsystem devices and at least one storage subsystem controller for efficiently responding to interrupts of multiple different types received by said storage subsystem controller according to claim 1 wherein said reversible processing includes transition processing.

5. The method in a data processing system having at least one host and a storage subsystem including a plurality of storage subsystem devices and at least one storage subsystem controller for efficiently responding to interrupts of multiple different types received by said storage subsystem controller according to claim 1 wherein said reversible processing includes application processing.

6. A data processing system having at least one host and a storage subsystem including a plurality of storage subsystem devices and at at least one storage subsystem controller for efficiently responding to interrupts of multiple different types received by said storage subsystem controller, said interrupts generated by a plurality of sources of real time events, said storage subsystem controller operating in one of a plurality of different states, said data processing system comprising:

means for determining a current state of said storage subsystem controller;

means for determining a selected type of interrupt for a next interrupt to be received by said storage subsystem controller in response to said determination of said current state;

means for determining a particular state of said storage subsystem controller associated with said occurrence of said selected type of interrupt; and means for initiating reversible processing associated with said particular state prior to receipt of a next interrupt.

7. The data processing system having at least one host and a storage subsystem including a plurality of storage subsystem devices and at least one storage subsystem controller for efficiently responding to interrupts of multiple different types received by said storage subsystem controller according to claim 6 further comprising:

means for terminating said initiated reversible processing in response to receipt of said next interrupt if said next interrupt is not said selected type of interrupt;

means for reversing the effect of said initiated reversible processing; and means for performing processing associated with said next interrupt.

8. The data processing system having at least one host and a storage subsystem including a plurality of storage subsystem devices and at least one storage subsystem controller for efficiently responding to interrupts of multiple different types received by said storage subsystem controller according to claim 6 wherein said reversible processing includes overhead processing.

9. The data processing system having at least one host and a storage subsystem including a plurality of storage subsystem devices and at least one storage subsystem controller for efficiently responding to interrupts of multiple different types received by said storage subsystem controller according to claim 6 wherein said reversible processing includes transition processing.

10. The data processing system having at least one host and a storage subsystem including a plurality of storage subsystem devices and at least one storage subsystem controller for efficiently responding to interrupts of multiple different types received by said storage subsystem controller according to claim 6 wherein said reversible processing includes application processing.

11. The data processing system having at least one host and a storage subsystem including a plurality of storage subsystem devices and at least one storage subsystem controller for efficiently responding to interrupts of multiple different types received by said storage subsystem controller according to claim 8 wherein said storage subsystem controller includes a table which identifies a selected type of interrupt for each of said plurality of states in which said storage system controller may operate.

12. The data processing system having at least one host and a storage subsystem including a plurality of storage subsystem devices and at least one storage subsystem controller for efficiently responding to interrupts of multiple different types received by said storage subsystem controller according to claim 11 further comprising means for accessing said table utilizing said current state.

* * * * *